(12) United States Patent
Renz et al.

(10) Patent No.: US 12,148,953 B2
(45) Date of Patent: Nov. 19, 2024

(54) CELL MODULE FOR A HIGH-VOLTAGE BATTERY AND METHOD FOR PRODUCING SAID CELL MODULE AND USE THEREOF

(71) Applicant: Dr. Ing. h.c. F. Porsche Aktiengesellschaft, Stuttgart (DE)

(72) Inventors: Fadi Renz, Kornwestheim (DE); Philip Ulrich, Ludwigsburg (DE); Martin Kohel, Prague (CZ)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 80 days.

(21) Appl. No.: 17/406,292

(22) Filed: Aug. 19, 2021

(65) Prior Publication Data

US 2022/0059906 A1 Feb. 24, 2022

(30) Foreign Application Priority Data

Aug. 20, 2020 (DE) ...................... 10 2020 121 878.8

(51) Int. Cl.
  *H01M 50/503* (2021.01)
  *H01M 50/213* (2021.01)
  *H01M 50/522* (2021.01)

(52) U.S. Cl.
  CPC ....... *H01M 50/503* (2021.01); *H01M 50/213* (2021.01); *H01M 50/522* (2021.01)

(58) Field of Classification Search
  CPC ............. H01M 50/503; H01M 50/213; H01M 10/0422; H01M 50/559; H01M 50/107; H01M 50/55
  See application file for complete search history.

(56) References Cited

U.S. PATENT DOCUMENTS

| | | | | |
|---|---|---|---|---|
| 2010/0015519 A1* | 1/2010 | Trester | ................ | H01M 50/503 174/68.2 |
| 2016/0172642 A1* | 6/2016 | Hughes | ............... | H01M 50/227 429/130 |
| 2017/0264107 A1* | 9/2017 | Cheon | ................ | H01M 10/486 |
| 2020/0243814 A1* | 7/2020 | Kang | .................. | H01M 50/519 |

FOREIGN PATENT DOCUMENTS

| | | | | |
|---|---|---|---|---|
| CN | 203967151 U | 11/2014 | | |
| DE | 102008059970 A1 * | 6/2010 | .......... | H01M 2/1077 |
| EP | 1109237 A1 | 6/2001 | | |
| EP | 2597701 A1 | 5/2013 | | |
| WO | 2020041585 A1 | 2/2020 | | |

OTHER PUBLICATIONS

Great Britain Combined Search and Examination Report for Application No. GB2111834.4, dated Apr. 19, 2022, 6 pages.
English translation of the Office Action (First Office Action) issued Nov. 30, 2023, by the National Intellectual Property Administration, P. R. China in corresponding Chinese Patent Application No. 202110939049.3. (8 pages).

\* cited by examiner

*Primary Examiner* — Matthew T Martin
*Assistant Examiner* — Grace Ann Kenlaw
(74) *Attorney, Agent, or Firm* — Buchanan Ingersoll & Rooney PC

(57) ABSTRACT

A cell module for a high-voltage battery having round cells polarized on one side and a common cell frame with cell connectors. The cell frame connects the cell connectors in a predefined arrangement. The cell connectors are configured for a low-voltage contact of the round cells. Also described is a method for producing the module, a corresponding use of the module and a corresponding high-voltage battery.

11 Claims, 7 Drawing Sheets

CELL MODULE FOR A HIGH-VOLTAGE BATTERY AND METHOD FOR PRODUCING SAID CELL MODULE AND USE THEREOF

CROSS REFERENCE TO RELATED APPLICATION

This application claims priority to German Patent Application No. 10 2020 121 878.8, filed Aug. 20, 2020, the content of such application being incorporated by reference herein in its entirety.

FIELD OF THE INVENTION

The present invention relates to a cell module for a high-voltage battery. The present invention furthermore relates to a corresponding method for producing said module and a corresponding use of said module and also a corresponding high-voltage battery.

BACKGROUND OF THE INVENTION

EP 2 597 701 A1, which is incorporated herein by reference, discloses a bipartite battery housing with a printed circuit board secured to the inner area of the first part and with a securing mechanism exposed on the surface thereof.

WO 2020/041585 A1, which is incorporated herein by reference, describes a printed circuit board arrangement for electrically connecting the cells of a battery pack for an electric vehicle. The arrangement comprises two types of printed circuit boards, which are connected to the cells in each case by a plurality of fuses.

SUMMARY OF THE INVENTION

Described herein is a cell module for a high-voltage battery, a corresponding method for producing said module and a corresponding use of said module and also a high-voltage battery comprising such a module.

One advantage of this cell module resides in the flexible linking of the cells for current, voltage and temperature measurement.

The cell module can comprise cell connectors with a double stamped rosette, along which the respective connector is displaced into its envisaged final position in order to compensate for manufacturing tolerances.

Furthermore, the cell frame can be manufactured from an injection molding with pre-embossed cell connector seats and a material application for the double rosette that includes a fusible pin. The process for producing the entire cell module and the battery can be greatly accelerated in this way.

Furthermore, the cell frame and the cell connectors can be shaped complementarily to one another in such a way that said cell connectors in the cell connector seats bear on the round cells and therebetween bear on the cell frame. This embodiment of the flexible cell frame creates a distance for the interconnection of the cells that helps to avoid a short circuit without additional insulation.

Such a cell frame may be assembled independently of the cells and be supplied to production line manufacturing as a complete assembly for joining to the cells. This assembly process in the context of preassembly enables the manufacturing costs of cell module and high-voltage battery to be significantly reduced.

BRIEF DESCRIPTION OF THE DRAWING FIGURES

An exemplary embodiment of the invention is illustrated in the drawings and is described in greater detail below.

DETAILED DESCRIPTION OF THE INVENTION

Figure 1:
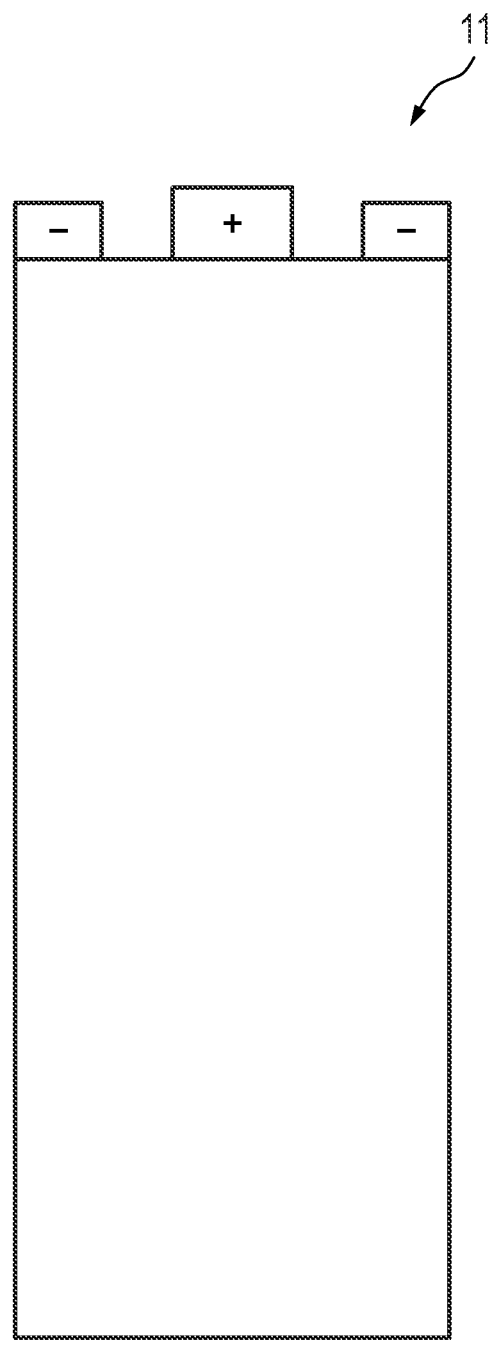
FIG. 1 shows a round cell polarized on one side.

FIG. 1 illustrates a round cell (11) polarized on one side for a high-voltage battery, not illustrated in its entirety, which can serve as mobile electrical energy storage in the form of a traction or drive battery for driving an electric vehicle.

Figure 2:
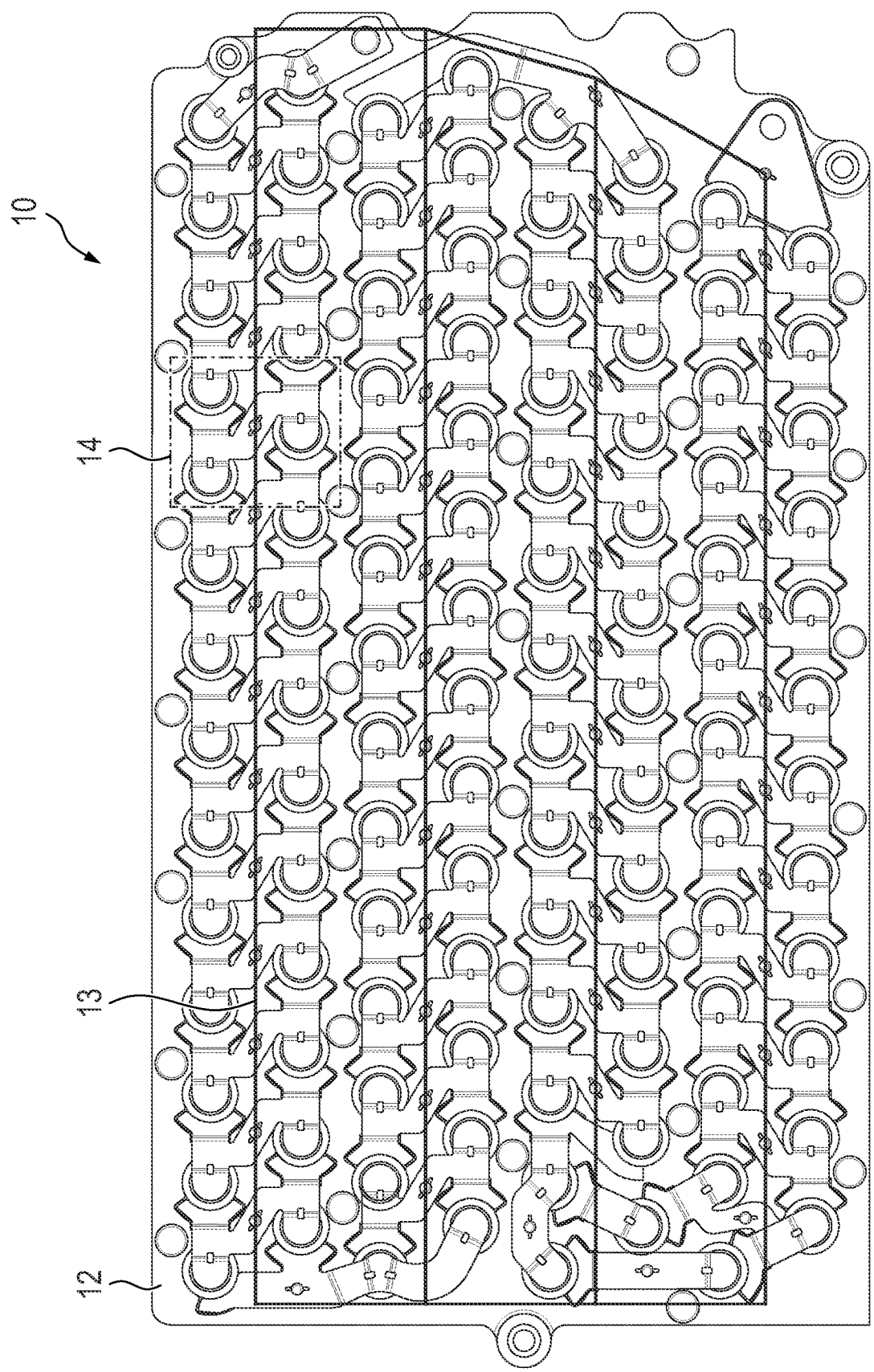
FIG. 2 shows a cell frame with highlighted low-voltage contact.

As illustrated in FIG. 2, a cell module (10) according to aspects of the invention comprises a multiplicity of such round cells (11) polarized on one side and a common cell frame (12) with cell connectors composed of copper or aluminum, which are connected by said cell frame in a predefined arrangement in order to enable the low-voltage contact (13) of the round cells (11) as per the illustration. Contact (13) may represent an electrical bus, for example.

Figure 3:
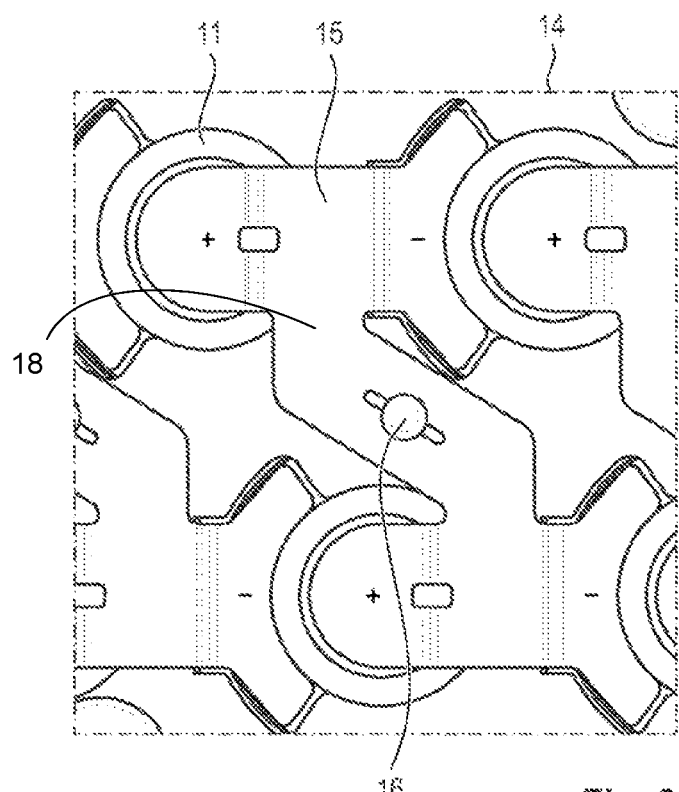
FIG. 3 shows a detail 14 of the cell frame in accordance with FIG. 2.

The detail illustration in accordance with FIG. 3 illuminates this linking concept more specifically: the cell frame (12—FIG. 2) is configured for a slot-type fusible pin fixing (16) of the cell connectors (15), near which the low-voltage contact (13) marked in FIG. 2 is provided and allows a simple current, voltage and temperature measurement.

Figure 4:
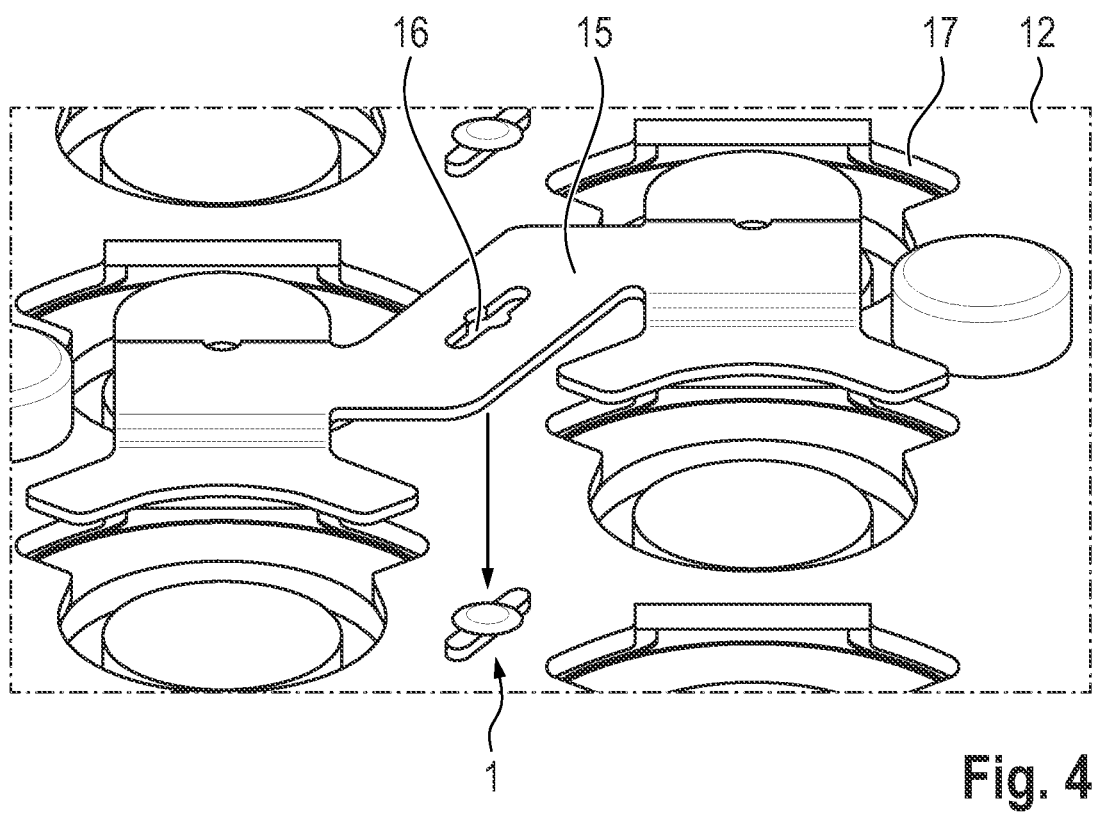
FIG. 4 shows the insertion of stamped cell connectors into pre-embossed cell connector seats.

The further drawings illuminate the production and use of such a cell module (10):

The stamped cell connectors (15) provided with a stamped rosette (18) are firstly inserted (see step 1 in FIG. 4) into the pre-embossed cell connector seats (17) of the cell frame (12) manufactured from injection molding. As best shown in FIG. 4, the embossed seats (17) constitute openings formed in the cell frame (12) through which the round cells are visibly exposed.

Figure 5:
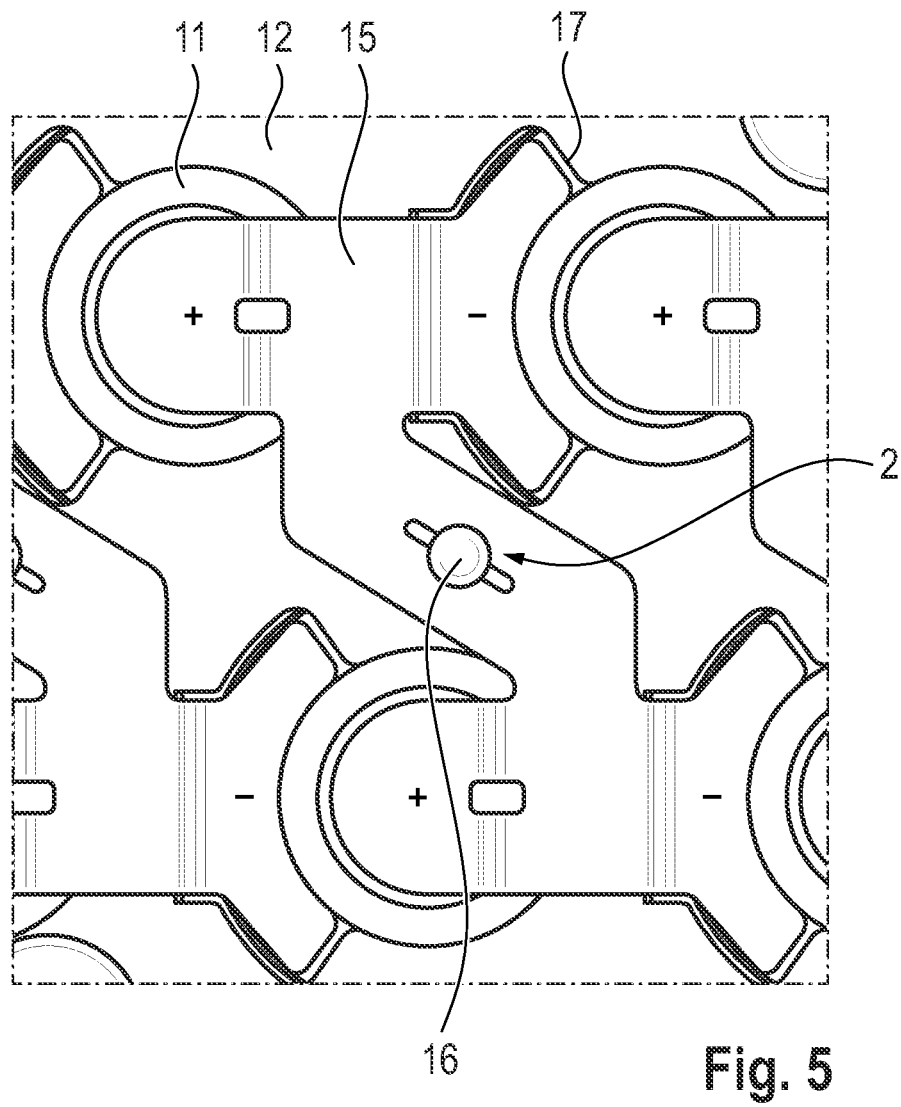
FIG. 5 shows the fusible pin fixing on the stamped rosette of a cell connector.

After the insertion step (1), the cell connectors (15) can be displaced as necessary along the stamped rosette (18) into their envisaged final position in order to restrict possible manufacturing tolerances. In this position they are finally secured (see securing step 2 in FIG. 5) by the fusible pin that projects through the stamped rosette (18) being fused to the cell frame (12), such that the fusible pin fixing (16) is able to fix the cell connectors (15) permanently in their cell connector seats (17).

Figure 6:
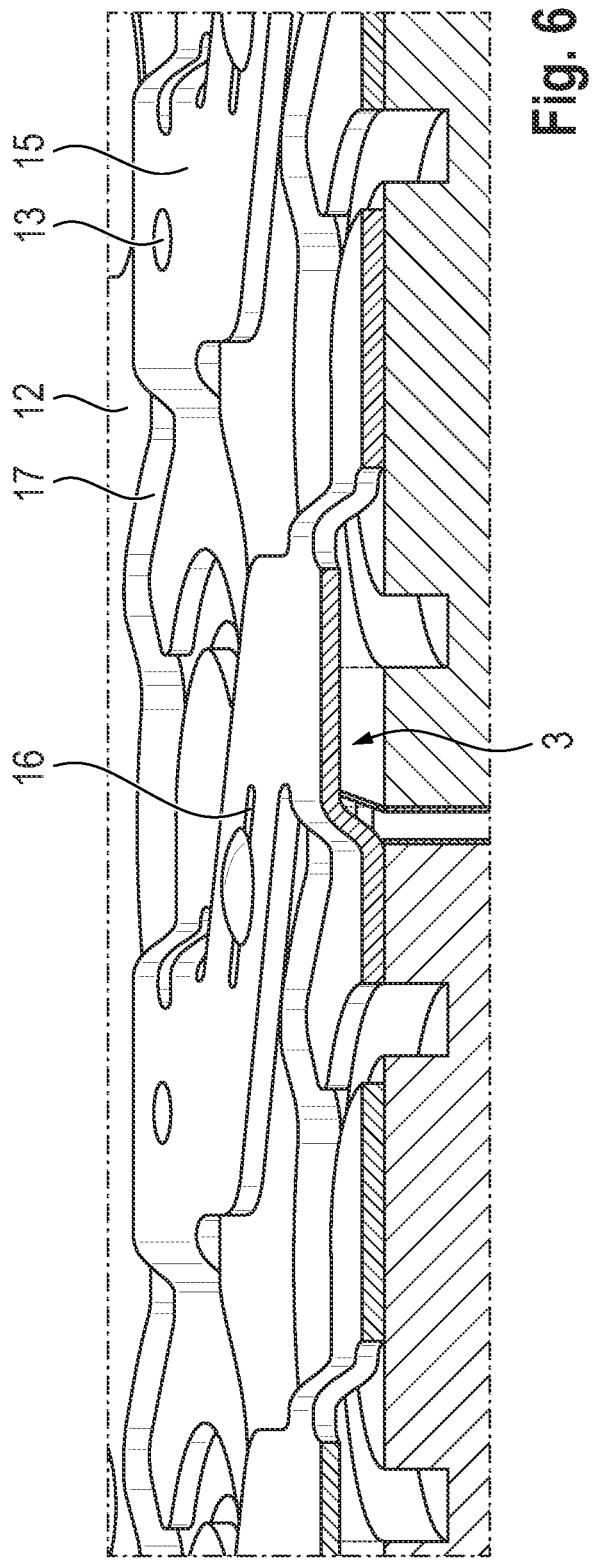
FIG. 6 shows the distance between cell connectors and cells between the cell connector seats.

The mutually complementary shaping of cell frame (12) and cell connectors (15) is chosen such that in this installation position current, voltage and temperature can be measured by means of the low-voltage contact (13), while the cell connectors (15) in the cell connector seats (17) bear on the round cells (11), and between the cell connector seats (17) the cell frame (12) nevertheless ensures a sufficient distance 3 shown in FIG. 6.

Figure 7:
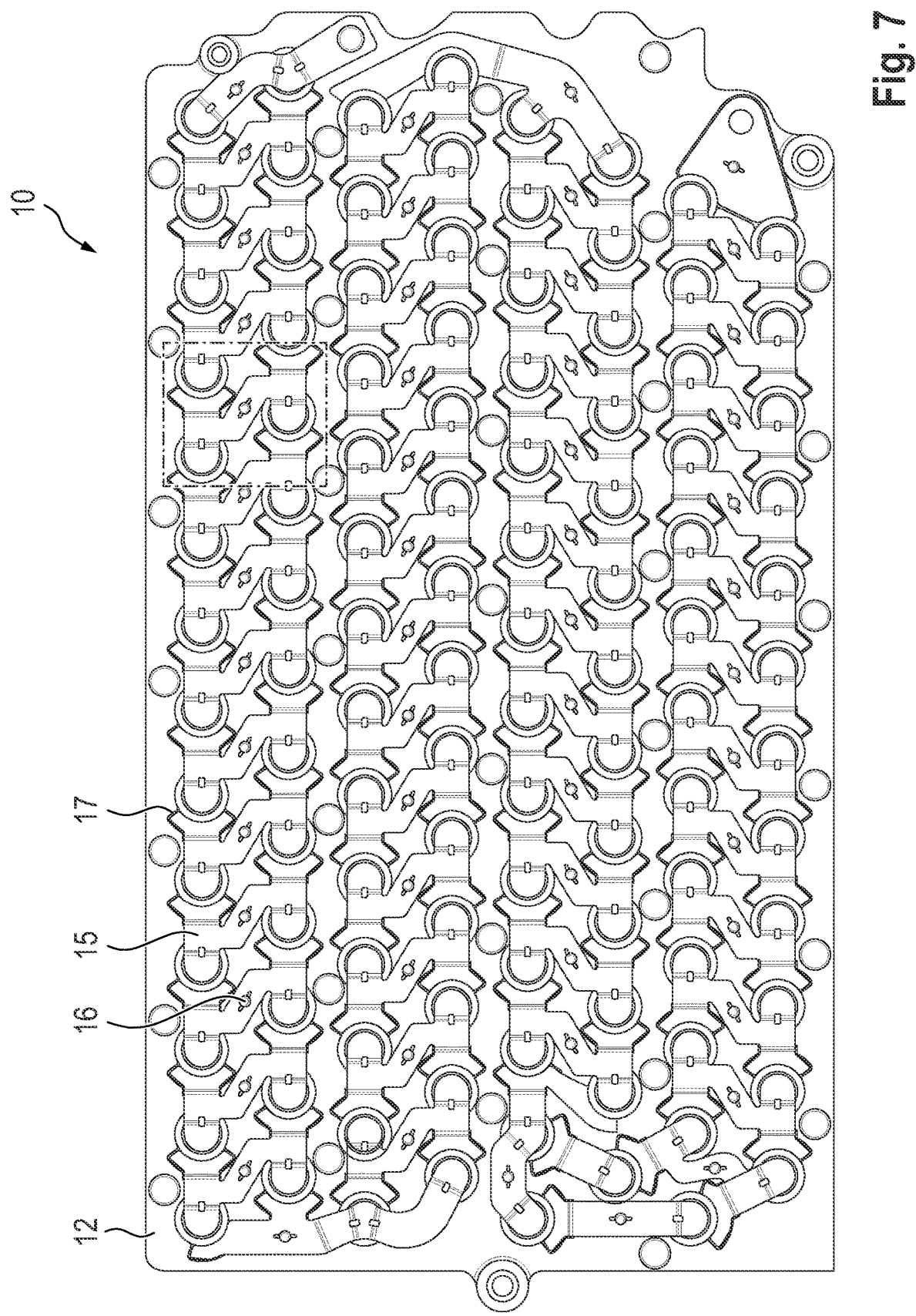
FIG. 7 shows the cell frame ready for joining to the cells in the assembly.

FIG. 7 shows the resulting assembly that can be provided to production line manufacturing for example as a complete assembly for joining to the cells.

What is claimed:

1. A cell module for a battery module, said cell module comprising:
    round cells polarized on one side, wherein each of the round cells includes a first terminal and a second terminal surrounding the first terminal,
    a common cell frame positioned over the round cells, the common cell frame including openings through which the round cells are exposed,
    cell connectors connected to the cell frame in a predefined arrangement by pins,
    wherein the cell connectors bear on the round cells and are configured as an electrical contact for the round cells,
    wherein each of the cell connectors is a unitary structure having two round cell connection ends and a bridge interconnecting the two round cell connection ends, wherein each of the round cell connection ends is connected to one of the round cells,
    wherein the bridge extends obliquely relative to the two round cell connection ends, and wherein one of the pins is disposed on the bridge,
    wherein each of the connection ends respectively includes (i) a first portion for bearing on the first terminal of a first round cell of the round cells and (ii) a second portion for bearing on the second terminal of a second round cell of the round cells that is adjacent to said first round cell,
    wherein the first portion is semi-circular and the second portion is arc-shaped,
    wherein each of the connection ends extends along a line, the line extending between the first portion and the second portion of each of the connection ends, wherein the line of one of the connection ends of one of the cell connectors is arranged parallel to the line of another of the connection ends of the one cell connector, and the bridge extends obliquely relative to the line.

2. The cell module as claimed in claim 1, wherein the cell frame has pre-embossed cell connector seats, and the pin fixes the cell connectors in the cell connector seats.

3. The cell module as claimed in claim 2, wherein the cell connectors each have a stamped rosette, and the one pin is provided on the stamped rosette.

4. The cell module as claimed in claim 3, wherein the cell connectors are composed of copper or aluminum.

5. The cell module as claimed in claim 2, wherein the cell frame and the cell connectors are shaped complementarily to one another in such a way that (i) the cell connectors in the cell connector seats bear on the round cells and (ii) a portion of the cell connectors between the cell connector seats bears on the cell frame.

6. A battery module comprising the cell module as claimed in claim 1.

7. The cell module as claimed in claim 1, wherein each of the pins is fused to the cell frame.

8. The cell module as claimed in claim 2, wherein the pre-embossed cell connector seats form part of the openings disposed in the cell frame.

9. The cell module as claimed in claim 1, wherein, for each of the cell connectors, the bridge is positioned at a higher elevation than the round cell connection ends.

10. The cell module as claimed in claim 1, wherein the first portion does not bear on the second terminal of the first round cell and the second portion does not bear on the first terminal of the second round cell.

11. The cell module as claimed in claim 1, wherein, for each of the round cells, the first terminal and the second terminal are exposed through one of the openings of the common cell frame.

* * * * *